Patented Nov. 9, 1926.

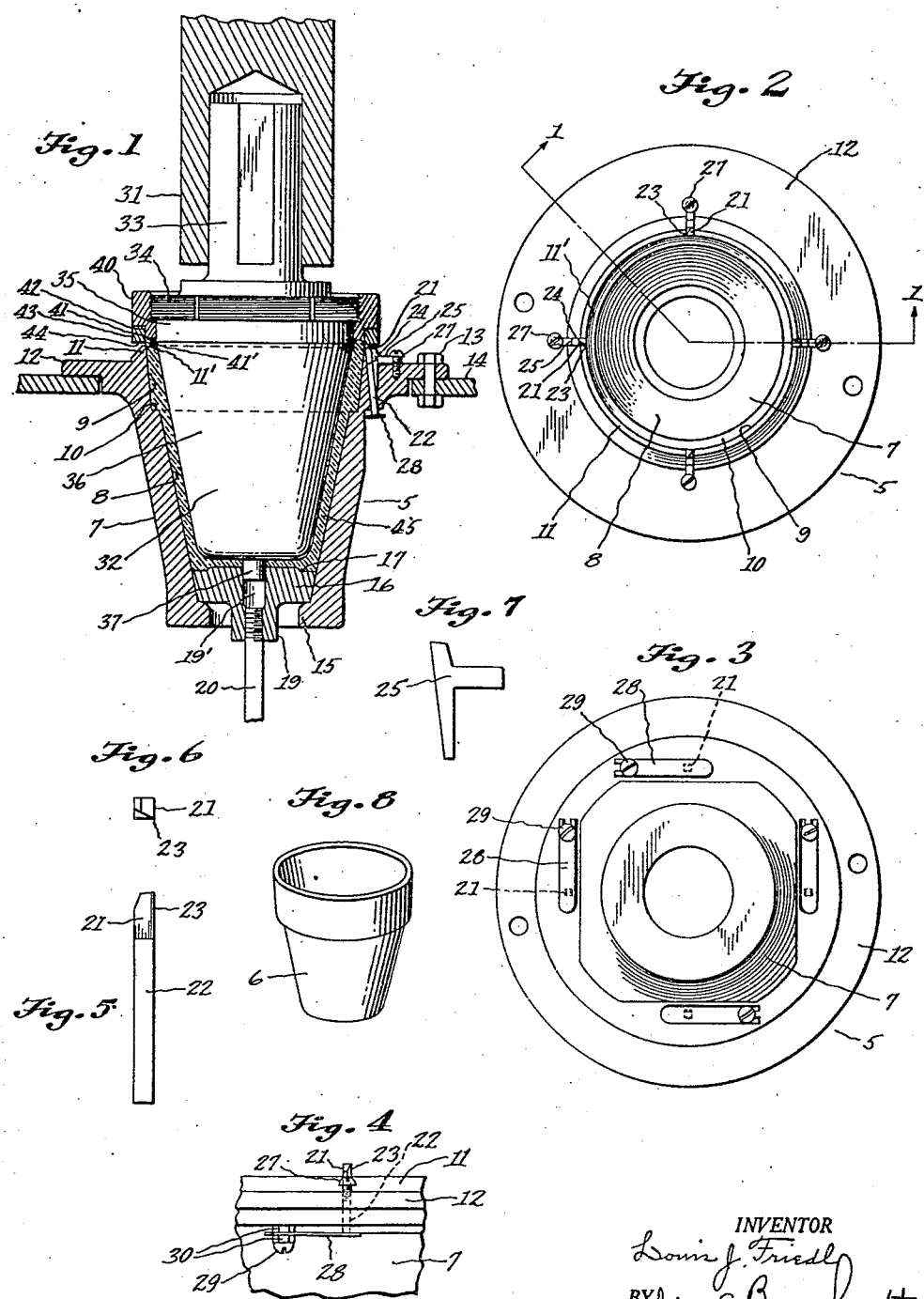

1,605,932

UNITED STATES PATENT OFFICE.

LOUIS J. FRIEDL, OF CLEVELAND, OHIO.

MOLDING MACHINE.

Application filed June 30, 1926. Serial No. 119,615.

This invention relates to new and useful improvements in molding machines and more particularly molds for forming and shaping articles of plastic material such as clay flower pots, cups, bowls and like objects, providing improved means for trimming away the plastic fin or feather edge of excess material formed between the mold and plunger top forming member on the article in the process of molding, which would ordinarily have to be removed after baking or setting of the article.

Other objects and features of the invention will be hereinafter pointed out and described.

In the drawings:—

Fig. 1 is a vertical section through the mold parts on line 1—1 of Fig. 2.

Fig. 2 is a plan view of the mold with the plunger removed.

Fig. 3 is a bottom view thereof.

Fig. 4 is a fragmentary side detail of a mold blade mounting.

Fig. 5 is a detail view of a trimming blade.

Fig. 6 is an end view thereof.

Fig. 7 is a detail view of a blade guide block.

Fig. 8 is a perspective view of a molded flower pot.

Referring specifically to the drawings, 5 indicates generally the mold shaped interiorly to form the exterior of the article to be molded which may be a flower pot, cup, bowl or other article molded of suitable material such as clay in a plastic condition. In the drawings the mold 5 is shown interiorly shaped to form the exterior of a flower pot indicated at 6, the mold having a body 7 with an internal lower substantially frustro-conical shaped wall surface 8 and an upper slightly frustro-conical shaped wall surface 9 joined by a ledge 10, an external annular shoulder 11 forming the mouth of the wall surface 9. The mold is supported by a flange 12 thereof secured by bolts 13 to the molding machine base 14.

A base member 16 seating into the lower smaller end of the body 7 internally flanged as at 15, has the top surface 17 thereof shaped to form the bottom outside surface of the flower pot or article to be molded. The base 16 is provided with a boss 19 into which is screw threaded a rod 20 actuated by the molding machine for pushing the base 16 upwardly, ejecting the molded flower pot.

A plurality of trimming blades 21 are slidably mounted in slots 24 provided in the annular shoulder 11 and flange 12. Blade guide blocks 25 are secured in slots 24 by screw 27. The blades 21 have square shanks 22 and beveled cutting edges 23 which are positioned at the inner edge 11' of shoulder 11, converging upwardly slightly with the axis of wall surfaces 8 and 9. The lower projecting ends of the blades 21 are supported by flat springs 28 secured by screw 29 and lock nuts 30 to the bottom side of flange 12.

The inside of the flower pot or article is formed by a core 32 or plunger axially rotated and reciprocated in relation to the wall surfaces 8 and 9 by the molding machine. The core 32, carried by a shank 33 mounted in the head 31 of the molding machine, has an enlarged screw threaded portion 24, a cylindrical portion 35 and a substantially frustro-conical shaped body 36 which forms the inner side and bottom of the article molded. A central pin 37 on the bottom of body 36 is adapted to enter base opening 19' and form the central hole in the bottom of the pot.

An internally threaded collar 40 having a concave pot top forming bottom 41 is threaded on core threads 34 with the edges of the bottom 41 flush with the top of the frustro-conical body 36 and set screwed. The collar 22 has a lower annular recess 42 into which is press fitted a wearing ring 43 of extra hard steel having its bottom side 44 in a horizontal plane with the collar concave bottom edges and the top of the body 36.

To operate, a lump of oiled clay is placed in the mold while the plunger is raised and the ejector base is seated in the bottom of the mold. The rotating plunger is introduced into the mold by the machine mechanism forcing the plastic clay 45 between the mold and plunger walls, taking the shape of a flower pot as shown in Fig. 1. The clay is picked up and carried around by the rotating plunger, the excess clay forcing outwardly between the top of mold shoulder 11 and the outer lower edge 41' of the pot top forming concave bottom 41 which would leave a fin on the finished pot or article of not removed by the blades which trim away the excess clay. The flat tops of the blades are engaged and pressed downwardly against springs 28 by the wearing ring bottom 44 providing a smooth contour of the pot top.

The blades 21 may be easily withdrawn for sharpening or renewal.

When the pot has been completely molded the plunger and ejector raise the pot for removal, the oil permitting the pot be withdrawn without distortion. The frustro-conical shape of the upper outer pot side permits the withdrawl thereof without disfiguring by the blades.

While I have shown and described one embodiment of the invention, obviously various changes in the proportions and details of construction may be made without departing from the spirit and scope of the appended claims.

I claim:—

1. The combination in a molding machine, of a mold body and core, a collar at the top of the core, a wearing ring extending around the lower edge of the collar, and a spring supported trimming blade mounted at the upper edge of the mold body in position to be engaged and pressed down by said wearing ring.

2. The combination in a molding machine, of a mold body, a core operating therein and having a portion over-hanging the top edge of the mold body, and a trimming blade spring supported in the upper edge of the mold body and normally projecting above the same for contact with the overhanging part of the core.

3. The combination in a molding machine, of a mold body having a flange at the top, a core co-operating with the body, an upwardly projecting trimming blade mounted in a recess in the flange of the body, and a spring secured to the under side of said flange and pressing upwardly on the trimming blade.

4. The combination in a molding machine, of a mold body having recesses in the upper edge thereof, a core co-operating with said body, trimming blades in said recessess, supporting springs under the trimming blades, and guide blocks in the recesses, besides the trimming blades.

5. The combination in a molding machine, of a mold body having a flange at the top with recesses therein, a reciprocating core co-operating with the mold body and having a collar thereon overhanging said recesses, and a plurality of spring supported trimming blades in said recesses, said blades normally projecting above the flange on the body and adapted to be depressed by the overhanging collar on the core.

In testimony whereof, I do affix my signature.

LOUIS J. FRIEDL.